(12) United States Patent
Mizobuchi et al.

(10) Patent No.: US 7,216,624 B2
(45) Date of Patent: May 15, 2007

(54) FUEL INJECTION VALVE FOR INTERNAL COMBUSTION ENGINE

(75) Inventors: Takeshi Mizobuchi, Obu (JP); Kimitaka Saito, Nagoya (JP); Norio Yamamoto, Kariya (JP); Zhenzhou Su, Okazaki (JP); Masatoshi Basaki, Nukata-gun (JP); Masao Sawamura, Okazaki (JP)

(73) Assignees: Denso Corporation, Kariya, Aichi-pref (JP); Nippon Soken, Inc., Nishio, Aichi-pref (JP)

(*) Notice: Subject to any disclaimer, the term of this patent is extended or adjusted under 35 U.S.C. 154(b) by 0 days.

(21) Appl. No.: 11/480,581

(22) Filed: Jul. 5, 2006

(65) Prior Publication Data

US 2007/0000476 A1    Jan. 4, 2007

(30) Foreign Application Priority Data

Jul. 4, 2005 (JP) ............................. 2005-195533
Mar. 30, 2006 (JP) ............................. 2006-095620
May 15, 2006 (JP) ............................. 2006-135591

(51) Int. Cl.
F02M 61/18 (2006.01)
(52) U.S. Cl. ................................. 123/305; 239/533.2
(58) Field of Classification Search ................ 123/305, 123/298, 301, 302; 239/463, 533.2, 533.3, 239/533.12, 585.2
See application file for complete search history.

(56) References Cited

U.S. PATENT DOCUMENTS

| 6,186,418 B1 | 2/2001 | Tani |
|---|---|---|
| 6,631,854 B1 | 10/2003 | Stier |
| 2002/0185104 A1 | 12/2002 | Arndt et al. |
| 2003/0209222 A1 | 11/2003 | Lippert et al. |
| 2004/0000603 A1 | 1/2004 | Peterson, Jr. |
| 2006/0157018 A1* | 7/2006 | Nakayama et al. ......... 123/298 |

FOREIGN PATENT DOCUMENTS

| EP | 1088973 A2 | 4/2001 |
|---|---|---|
| JP | 10-288127 | 10/1998 |
| JP | 2003-227441 A * | 8/2003 |
| JP | 2003-227444 | 8/2003 |
| JP | 2004-019569 | 1/2004 |
| JP | 2004-028078 | 1/2004 |

OTHER PUBLICATIONS

European Search Report dated Oct. 11, 2006.

* cited by examiner

Primary Examiner—Hieu T. Vo
(74) Attorney, Agent, or Firm—Nixon & Vanderhye P.C.

(57) ABSTRACT

A fuel injection valve for an engine includes a nozzle located in the vicinity of a cylinder head of the engine. The nozzle has nozzle holes each being opposed to an in-cylinder space defined in a cylinder of the engine. Each nozzle hole has an imaginary injection line that extends from each nozzle hole into the in-cylinder space. The imaginary injection line is directed toward either an upper surface of the piston or the wall surface of the cylinder. The in-cylinder space includes divided spaces each including the nozzle and at least one imaginary injection line. The divided spaces include a piston-side divided space and a head-side divided space. The head-side divided space contains fuel and air mixed at an air fuel ratio that is greater than an air fuel ratio of fuel and air in the piston-side divided space.

15 Claims, 9 Drawing Sheets

FUEL INJECTION VALVE FOR INTERNAL COMBUSTION ENGINE

CROSS REFERENCE TO RELATED APPLICATIONS

This application is based on and incorporates herein by reference Japanese Patent Applications No. 2005-195533 filed on Jul. 4, 2005, No. 2006-95620 filed on Mar. 30, 2006, and No. 2006-135591 filed on May 15, 2006.

FIELD OF THE INVENTION

The present invention relates to a fuel injection valve for an internal combustion engine.

BACKGROUND OF THE INVENTION

In general, a fuel injection valve includes a nozzle having multiple nozzle holes. The fuel injection valve injects fuel directly into an internal combustion engine through the nozzle holes. The nozzle is directed from a cylinder head toward a piston of the engine. In recent years, it is requested to enhance output power and reduce emission in an engine. Therefore, it is necessary to efficiently form a mixture of intake air and fuel injected from the fuel injection valve into the cylinder. In particular, it is important to efficiently utilize intake air and efficiently burning injected fuel in the cylinder.

According to JP-A-2003-227444, fuel is injected at an early timing in an intake stroke, so that mixture of intake air and injected fuel is further accelerated. In addition, penetration of injected fuel is maintained, so that injected fuel is restricted from being adhered onto a wall surface of the cylinder. Thus, fuel is restricted from being unburned.

According to JP-A-2004-28078, two sprays are formed vertically with respect to the axial direction of the cylinder, so that mixture of air and fuel is accelerated in the cylinder.

However, in the operation of JP-A-2003-227444, intake air fluctuates in flow direction and flow amount corresponding to an operating condition of the engine. Consequently, mixture of intake air and fuel is apt to be unstable.

According to JP-A-2004-28078, mixture of air and fuel is accelerated in a limited region, in which two sprays are formed in the cylinder. Consequently, intake air may be partially unburned in the cylinder.

SUMMARY OF THE INVENTION

In view of the foregoing and other problems, it is an object of the present invention to produce a fuel injection valve for an internal combustion engine, the fuel injection valve being adapted to efficiently utilizing a space in a cylinder of the engine by adjusting mixture of air and fuel.

According to one aspect of the present invention, a fuel injection valve is provided for injecting fuel into an internal combustion engine. The internal combustion engine includes a cylinder, a cylinder head, and a piston. The piston is movable along a wall surface of the cylinder. The fuel injection valve includes a nozzle that is located in the vicinity of the cylinder head. The nozzle has a plurality of nozzle holes. Each of the plurality of nozzle hole is defined in the following manner. Each nozzle hole is opposed to an in-cylinder space defined in the cylinder. Each nozzle hole has an imaginary injection line that extends from each nozzle hole into the in-cylinder space. The imaginary injection line is directed toward one of an upper surface of the piston and the wall surface of the cylinder. The in-cylinder space includes a plurality of divided spaces each including the nozzle and at least one imaginary injection line. The plurality of divided spaces includes a piston-side divided space and a head-side divided space. The piston-side divided space is adjacent to the piston. The head-side divided space is adjacent to the cylinder. The head-side divided space contains fuel and air mixed at an air fuel ratio that is greater than an air fuel ratio of fuel and air in the piston-side divided space.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
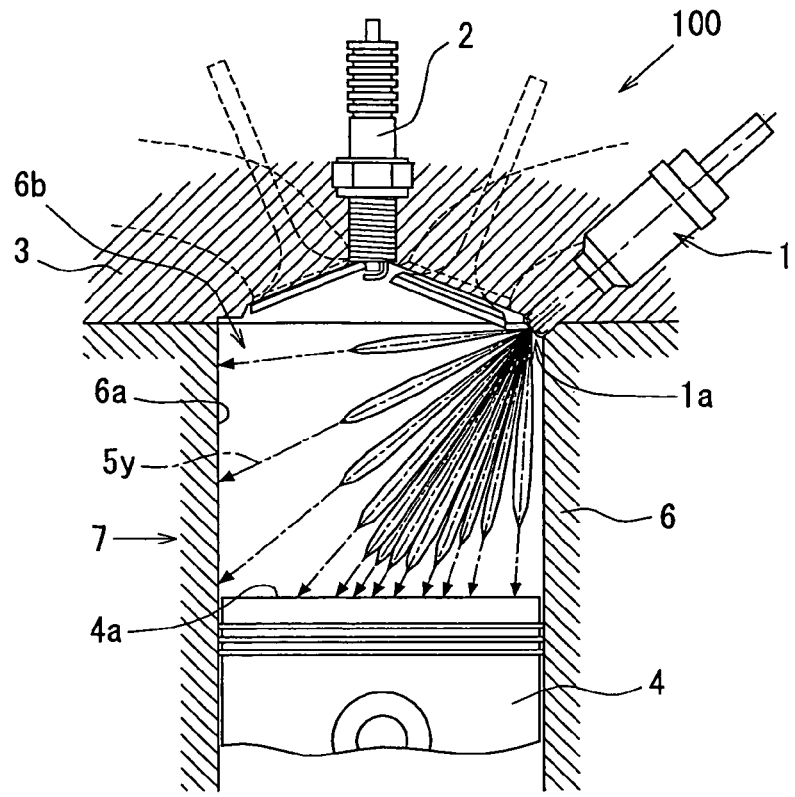
FIG. 1 is a partially longitudinal sectional view showing a cylinder of an engine provided with a fuel injection valve according to a first embodiment.

The first embodiment is described in reference to FIGS. 1 to 7. An injector 1 is a fuel injection valve for an internal combustion engine 100 such as a gasoline engine. The engine 100 has a cylinder block 7 that has a cylinder 6. The injector 1 injects high pressure fuel directly into the cylinder 6 of the engine 100. The injector 1 is provided to each combustion chamber of the cylinder 6 of the engine 100. The injector 1 has multiple nozzle holes 51.

As shown in FIGS. 1 to 5, the injector 1 includes a nozzle 1a having the nozzle holes 51. The nozzle holes 51 faces to a space in the cylinder 6 of the engine 100. The nozzle 1a is located in the cylinder 6 on the side of the cylinder head 3. More specifically, the nozzle 1a is located around a corner (upper corner region) in the cylinder 6 on the upper side in FIG. 1. Fuel is injected from the nozzle 1a, which is located in the upper corner region, directly into the cylinder 6 through the nozzle holes 51. The location of the nozzle 1a is not limited to the upper corner region. For example, the nozzle 1a may be arranged in the cylinder head 3 such that the nozzle 1a opposes to a substantially center of the piston 4.

Fuel is injected into the cylinder 6 and the piston 4 through the nozzle holes 51 of the nozzle 1a. Fuel is pressurized using a fuel feed unit (not shown). Fuel is increased in pressure to be in a range between 2 MPa and 13 MPa, for example, so that the pressurized fuel is injected. The cylinder head 3 is provided with an ignition plug 2.

Figure 2:
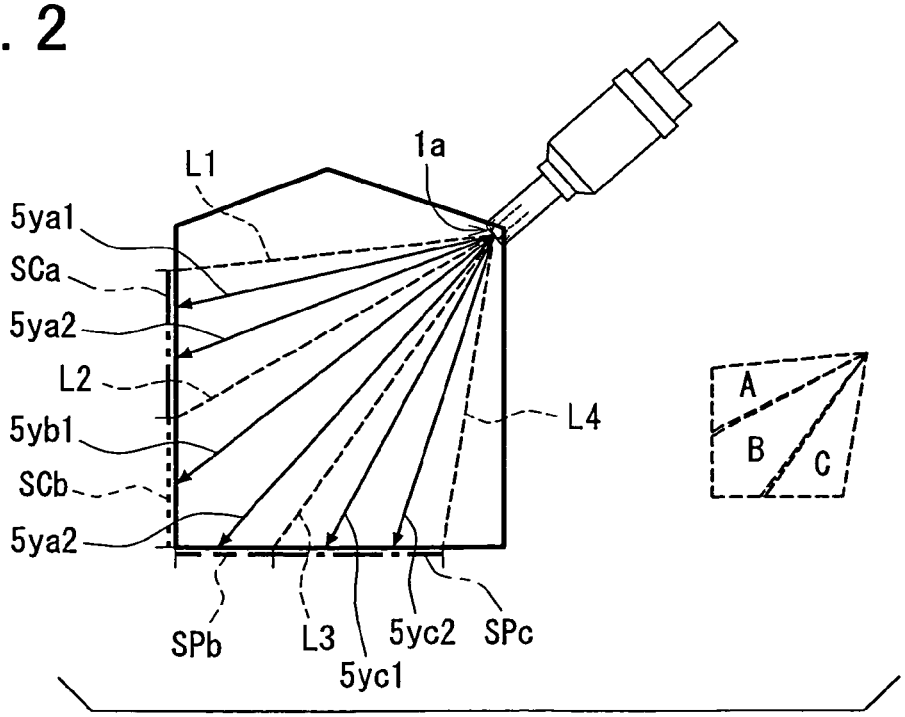
FIG. 2 is a schematic view showing divided spaces formed in the cylinder, according to the first embodiment.

As shown in FIG. 2, a region (space region) of the space (in-cylinder space) 6b in the cylinder 6 is divided into divided spaces A, B, and C, corresponding to distribution of fuel injected into the cylinder 6 through the nozzle holes 51. Distribution of the fuel amount with respect to the divided spaces A, B, and C and penetration of fuel spray are adjusted in accordance with the specification such as the dimension of each of the nozzle holes 51, the amount of fuel injection, and penetration of fuel injection. The specification of each of the nozzle holes 51 is defined by determining the direction (injecting direction), along which fuel is injected, for example.

Next, determination of the divided spaces A, B, and C is described. As referred to FIG. 3, the flow passage of the nozzle hole 51 has the centerline (straight line) 5x. As referred to FIG. 1, fuel spray is injected through the nozzle hole 51 along each imaginary injection line 5y that is an imaginary straight centerline. The centerline 5x is connected with the imaginary injection line 5y to be one axial line. The jet nozzles have centers that are defined as an injection base point of the nozzle 1a. As referred to FIGS. 1, 2, divided spaces A, B, and C are defined such that each of the divided spaces A, B, and C includes the injection base point and at least one of the imaginary injection lines 5y.

As referred to FIG. 2, the divided spaces A, B, and C are divided by divisional lines L1 to L4. The divisional lines L1 to L4 are respectively extend radially from the injection base point toward an upper surface 4a of the piston 4 and a wall surface 6a of the cylinder 6. The in-cylinder space 6b is divided by at least three divisional lines. The divided spaces A, B, and C are defined by imaginary planes, which are defined among the divisional lines L1 to L4, the upper surface 4a of the piston 4 and the wall surface 6a of the cylinder 6. The space, which are divided in the in-cylinder space 6b, include both the upper surface 4a of the piston 4 and the wall surface 6a of the cylinder 6. The piston 4 is inserted along the wall surface 6a of the cylinder 6.

The in-cylinder space 6b is not limited to be divided into the three divided spaces A, B, and C, which are laterally divided as depicted in FIG. 2. The in-cylinder space 6b may be divided into three or more spaces. The in-cylinder space 6b may be divided such that divisional surfaces may be laterally and/or vertically defined in the in-cylinder space 6b, so that the divisional surfaces may be combined to define the divided spaces in the in-cylinder space 6b. FIG. 2 depicts the lateral cross section (rectangular cross section) of the in-cylinder space 6b when being viewed from the lateral side thereof. The in-cylinder space 6b is divided such that all the divided spaces include the injection base point in the lateral cross section. When the in-cylinder space 6b is viewed from the vertical direction from the upper side in FIG. 2, the vertical cross section of the in-cylinder space 6b is in a substantially circular shape. The in-cylinder space 6b may be divided such that all the divided spaces include the injection base point in the vertical cross section.

Next, distribution of fuel into the divided spaces A, B, and C is described.

Volumes of the divided spaces A, B, and C and air-fuel ratios λ in the corresponding one of the divided spaces A, B, and C are variably set for the distribution of fuel. The air-fuel ratios λ respectively correspond to distribution of fuel injected into the divided spaces A, B, and C. As the air-fuel ratio λ becomes greater, an amount of fuel becomes small with respect to a specific amount of air, so that the fuel becomes lean with respect to air.

In this embodiment, an amount (fuel injection amount) of fuel injected from each of the nozzle holes is substantially uniformly set. In addition, number density of the imaginary injection lines with respect to the volume of the in-cylinder space 6b is variably controlled. The air-fuel ratio λ in each of the divided spaces A, B, and C is predetermined. For example, the air-fuel ratio λ in the divided space A, which is in the vicinity of the cylinder head 3, is greater than the air-fuel ratio λ in the divided space C, which is in the vicinity of the piston 4. Relationship between the gravity point of each of the divided spaces A, B, and C and the locations of the piston 4 and the cylinder 3 is evaluated, so that it is determined which the cylinder head 3 or the piston 4 is close to the one of the divided spaces A, B, and C. The number of density of the imaginary injection lines arranged in each of the divided spaces A, B, and C is set in accordance with temperature (estimated temperature) on the wall surface 6a of the cylinder 6 and temperature (estimated temperature) on the upper surface of the piston 4. Thus, the fuel injection amount of each of the divided spaces A, B, and C is determined.

As referred to FIG. 2, imaginary injection lines 5ya1, 5ya2 are arranged in the divided space A, for example. The imaginary injection lines 5ya1, 5ya2 are directed toward the wall surface SCa of the cylinder 6, for example. Imaginary injection lines 5yb1, 5yb2 are arranged in the divided space B, for example. The imaginary injection line 5yb1 is directed toward the wall surface SCb of the cylinder 6. The imaginary injection line 5yb2 is directed toward the upper surface SPb of the piston 4. Imaginary injection lines 5yc1, 5ya2 are directed toward the upper surfaces SPb, SPc of the piston 4, for example. The number of density of the imaginary injection lines is variably set such that the air fuel ratios λ in the divided spaces A, B, and C have a specific relationship. For example, the air fuel ratio λ (λB) in the divided space A is greater than the air fuel ratio λ (λB) in the divided space B, and the air fuel ratio λ (λB) in the divided space B is greater than the air fuel ratio λ (λC) in the divided space C. That is, the air fuel ratios λA, λB, and λC have the following relationship: λA>λB>λC.

In the example depicted in FIG. 2, two of the imaginary injection lines 5y are depicted in each of the divided spaces A, B, and C. In this example, the air fuel ratio λC in the divided space C on the side of the piston 4 is set to be less than the air fuel ratio λA in the divided space A on the side of the cylinder head 3, so that mixture of air and fuel is accelerated. The reason of this acceleration of the mixture is considered as follows. In general, temperature of the upper surface 4a of the piston 4 is apt to be higher than temperature of the wall surface 6a of the cylinder 6.

In general, cooling water or the like may be supplied in the engine block around the wall surface 6a of the cylinder 6, so that temperature of the wall surface 6a of the cylinder 6 may be reduced compared with the upper surface 4a of the piston 4.

When fuel injected from the nozzle hole 51 partially approaches the surfaces 4a, 6a, the fuel adhered onto the surfaces 4a, 6a is vaporized. In this situation, as the temperature of the surfaces 4a, 6a becomes higher, vaporization of the adhered fuel is accelerated, so that mixture of air and fuel may be accelerated. Therefore, vaporization on the upper surface 4a of the piston 4 is further accelerated compared with the vaporization on the wall surface 6a of the cylinder 6.

Thus, the air-fuel ratio λC in the divided space C on the side of the piston 4 is set to be low, i.e., set to be in a fuel rich condition compared with the air-fuel ratio λA in the divided space A on the side of the cylinder 6. Consequently, a greater amount of fuel is injected into the region on the side of the piston 4. In this operation, injected fuel can be restricted from being condensed, so that mixture of air and gas can be accelerated. Temperature of the center of the upper surface 4a of the piston 4 is apt to be higher than temperature of the outer periphery of the upper surface 4a of the piston 4. Therefore, an amount of fuel injected to the center of the upper surface 4a of the piston 4 may be set greater than an amount of fuel injected to the outer periphery of the upper surface 4a of the piston 4.

It is estimated that the difference between the temperature of the wall surface 6a of the cylinder 6 and the upper surface 4a of the piston 4 produces the following effect. When fuel injected from the nozzle hole 51 is partially adhered onto the surfaces 4a, 6a, evaporation of fuel adhered on the upper surface 4a of the piston 4 in the divided space C is further accelerated compared with evaporation of fuel adhered on the wall surface 6a of the cylinder 6 in the divided space A. In this condition, latent heat of evaporated fuel is increased by accelerating evaporation of fuel. Therefore, gas in the cylinder is further cooled by latent heat of evaporated fuel, so that an amount of air supplied into the cylinder may be increased. Thus, charging efficiency is enhanced, so that mixing air and fuel may be accelerated.

Figure 3:
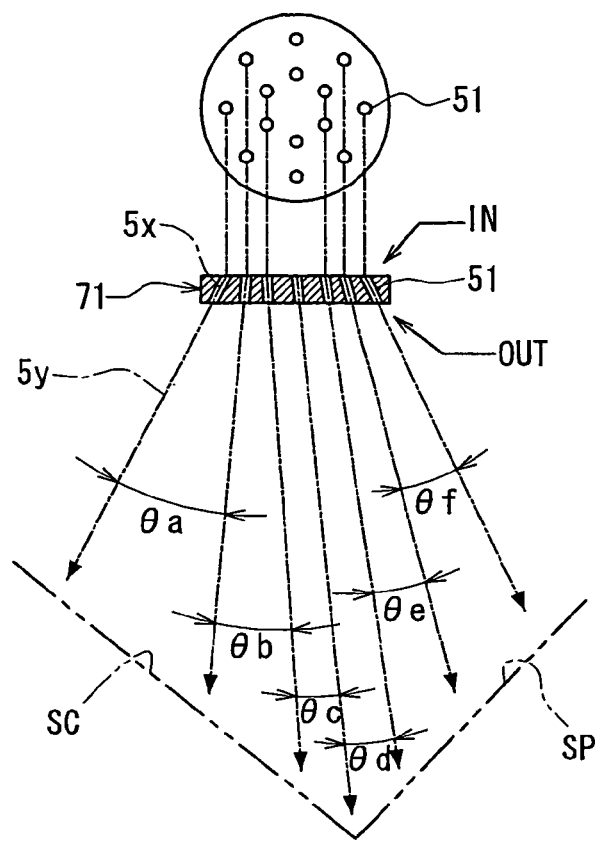
FIG. 3 is a schematic view showing a nozzle of the fuel injection valve and imaginary injection lines of fuel injected from the nozzle, according to the first embodiment.
Figure 4:
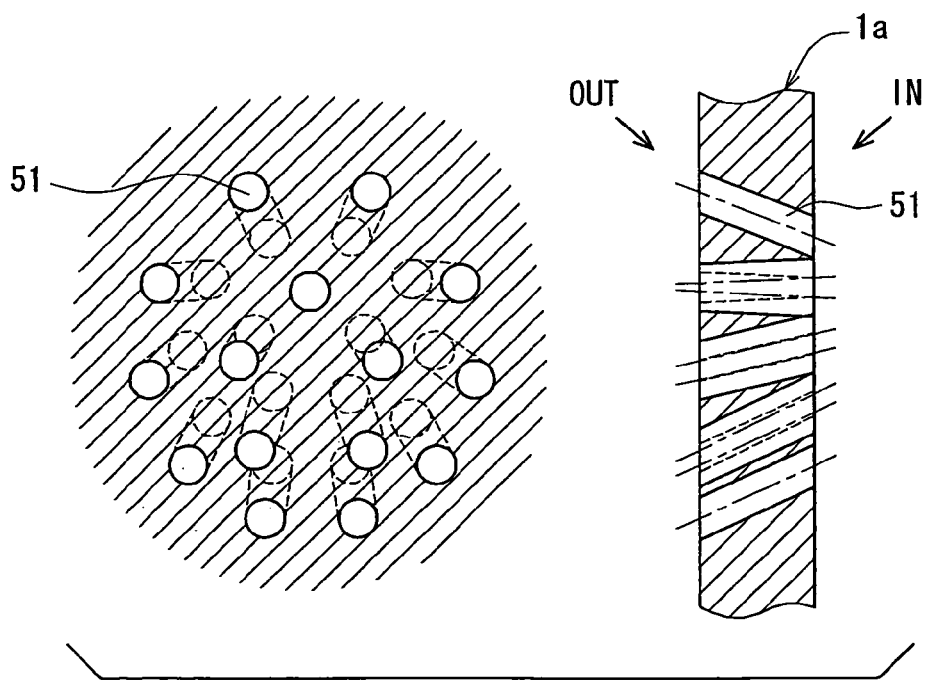
FIG. 4 is a schematic view showing the nozzle plate according to the first embodiment.
Figure 5:
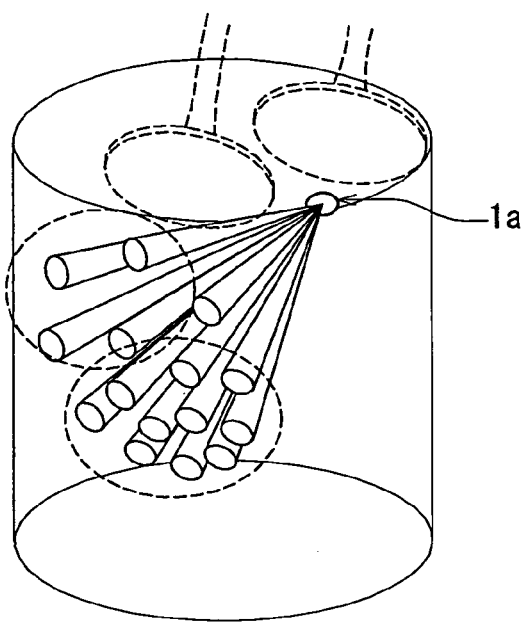
FIG. 5 is a schematic perspective view showing the cylinder and fuel injected into the cylinder, according to the first embodiment.

As referred to FIG. 3, a nozzle plate 71 is in a substantially disc-shape having two substantially flat surfaces, which are substantially in parallel. One of the two substantially flat surfaces is on the side of a fuel inlet on the upper side in FIG. 3. The other of the two substantially flat surfaces is on the side of a fuel outlet on the lower side in FIG. 3. The nozzle plate 71 has fourteen nozzle holes 51, for example. The amount of fuel injected from each of the nozzle holes 51 is substantially uniform. The number of density of the imaginary lines 5y with respect to a unit volume is controlled. For example, each of the injecting direction into the in-cylinder space 6b through each of the nozzle holes 51 is variably adjusted, so that distribution of the air-fuel ratio λ in the in-cylinder space 6b is controlled. In FIG. 3, the wall surface SC of the cylinder 6 and the upper surface SP of the piston 4 are depicted. The nozzle holes 51 are arranged along two larger and smaller imaginary circles on the side of the fuel inlet depicted by IN in FIGS. 3, 4. The nozzle holes 51 are arranged at substantially regular intervals. The angle of the centerline 5x of each of the nozzle holes 51 is adjusted on the side of the fuel outlet depicted by OUT in FIGS. 3, 4. Accordingly, the nozzle holes 51 are arranged at irregular intervals on the side of the fuel outlet.

The fuel outlet of each of the nozzle holes 51 is distant from corresponding at least one of the wall surface 6a of the cylinder 6 and the upper surface 4a of the piston 4 for a specific injection distance. Penetration of fuel injected from each of the nozzle holes 51 is corrected in accordance with the differences among the above injection distances. This correction is performed such that fuel, which is injected from the nozzle holes 51, is almost entirely evaporated immediately before the injected fuel arrives at the wall surface 6a of the cylinder 6 and/or the upper surface 4a of the piston 4.

As referred to FIG. 3, the air-fuel ratio λ and penetration of injected fuel are controlled by adjusting the number of density of the imaginary injection lines with respect to the unit volume.

Next, the control of penetration of injected fuel is described. As referred to FIG. 3, injected fuel is radially diffused from the nozzle 1a into the in-cylinder space 6b. Two of the imaginary lines 5y, which are adjacent to each other, define opening angles θa to θf therebetween. Each of the nozzle holes 51 controls fuel injection on the basis of the opening angles θa to θf and the penetration of fuel injection. Specifically, as each of the opening angles θa to θf is set to be small, the penetration of fuel injection becomes large.

For example, the opening angle θa is set to be greater than the opening angle θc. In this case, the penetration of fuel injection corresponding to the imaginary injection line 5y partially defining the opening angle θc is set to be greater than the penetration of fuel injection corresponding to the imaginary injection line 5y partially defining the opening angle θa. The opening angles θa, θb, and θc are set to satisfy the following relationship: θa>θb>θc. The penetration of fuel injection becomes large from the vicinity of the imaginary injection line 5y partially defining the opening angles θa toward the vicinity of the imaginary injection line 5y partially defining the opening angles θc. As the opening angle θ becomes small, air resistance, which is exerted against fuel injected along the corresponding imaginary injection line 5y, decreases. Thus, the penetration of fuel injection can be controlled in accordance with the opening angles θa to θc.

Figure 6:
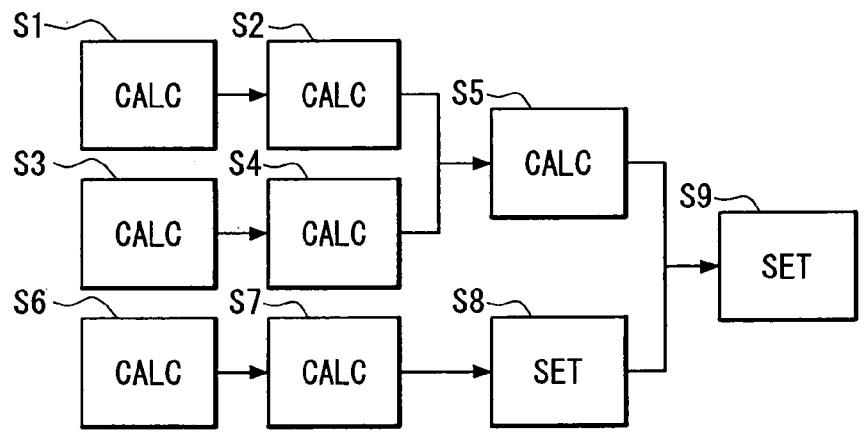
FIG. 6 is a flowchart showing a procedure for determining a specification of a nozzle hole of the nozzle, according to the first embodiment.

Next, determination of the air-fuel ratio λ and the penetration of fuel injection with respect to each of the nozzle holes 51 is described in reference to FIG. 6. In step S1, a piston-occupied area is calculated. The piston-occupied area is an area of the upper surface 4a of the piston 4 at least partially occupied by each of the divided spaces A, B, and C. In step S2, a piston correction coefficient is defined such that the air-fuel ratio λ is calculated to be small as the piston-occupied area becomes large. In step S3, a cylinder-occupied area is calculated. The cylinder-occupied area of the wall surface 6a of the cylinder 6 is an area at least partially occupied by each of the divided spaces A, B, and C. In step S4, a cylinder correction coefficient is defined such that the air-fuel ratio λ is calculated to be small as the cylinder-occupied area becomes large.

In step S5, the fuel injection amount into each of the divided spaces A, B, and C is calculated in accordance with the piston correction coefficient and the cylinder correction coefficient calculated in steps S2, S4. In step S6, the injection distances are calculated. Each of the injection distances is the length between the fuel outlet of each of the nozzle holes 51 and the surface, onto which fuel is injected from the corresponding one of the nozzle holes 51. In step S7, a penetration correction coefficient is calculated corresponding to each of the injection distances. In step S8, the penetration of fuel injection is set for each of the nozzle holes 51 on the basis of the corresponding penetration correction coefficient. In step S9, the specification of each of the nozzle holes 51 is set in accordance with the fuel injection amount calculated at step S5 and the penetration of fuel injection set at step S8.

Figure 7:
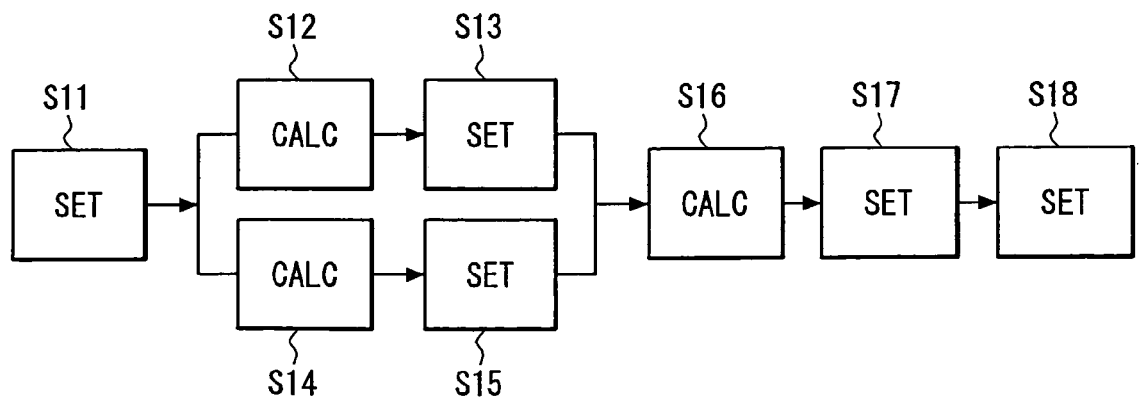
FIG. 7 is a flowchart showing another procedure for determining a specification of a nozzle hole of the nozzle, according to the first embodiment.

Next, a procedure for setting the specification of the nozzle holes 51 is described in reference to FIG. 7. In step S11, a standard sir-fuel ratio λ serving as a standard value is set for each of the divided spaces A, B, and C. In step S12, the piston-occupied area of the upper surface 4a of the piston 4 at least partially occupied by each of the divided spaces A, B, and C is calculated. In step S13, a piston correction coefficient is set such that the standard air-fuel ratio λ is calculated to be small as the piston-occupied area becomes large. In step S14, a cylinder-occupied area of the wall surface 6a of the cylinder 6 at least partially occupied by each of the divided spaces A, B, and C is calculated. In step S15, a cylinder correction coefficient is set such that the standard air-fuel ratio is calculated to be small as the cylinder-occupied area becomes large.

In step S16, an air-fuel ratio correction coefficient is calculated in accordance with the piston correction coefficient and the cylinder correction coefficient set at steps S13, S15. The air-fuel ratio correction coefficient is used for correcting the air-fuel ratio λ in each of the divided spaces A, B, and C. In step S17, the fuel injection amount is set for each of the divided spaces A, B, and C in accordance with the air-fuel ratio correction coefficient calculated in step S16. In step S18, the specification of each of the nozzle holes 51 is set in accordance with the fuel injection amount set at step S17.

Figure 8:
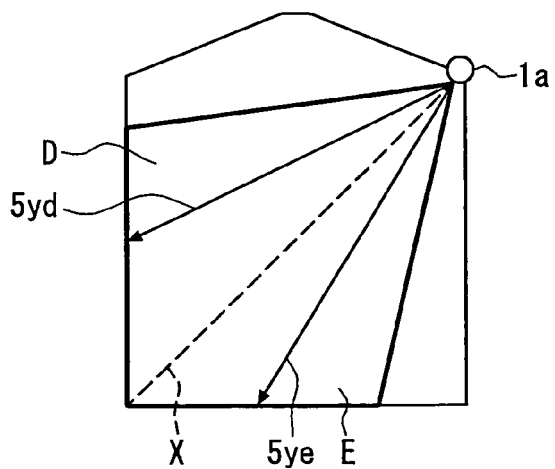
FIG. 8 is a schematic view showing two divided spaces formed in the cylinder, according to the first embodiment.

In this embodiment, a partial region of the entire space of the cylinder is divided into the divided spaces A, B, and C, such that the partial region includes the upper surface 4a of the piston 4 and/or the wall surface 6a of the cylinder 6. As shown in FIG. 8, the partial region, which includes the nozzle 1a, of the in-cylinder space 6b may be divided into divided spaces such as an upper corner space D and a lower corner space E partitioned by an imaginary divisional plane X. The upper corner space D is located on the side of the cylinder head 3. The lower corner space E is opposed to the upper corner space D. The lower corner space E is adjacent to the upper corner space D via the imaginary divisional plane X. In this case, the partial region is divided into two spaces, so that specifying the nozzle holes 51 can be facilitated. In addition, the partial region is divided into two spaces, so that setting the specifications of the nozzle holes 51 can be facilitated.

The entire in-cylinder space 6b may be divided into the divided spaces such as the divided spaces A, B, and C, instead of dividing the partial region of the entire in-cylinder space 6b into the divided spaces.

Figure 9:
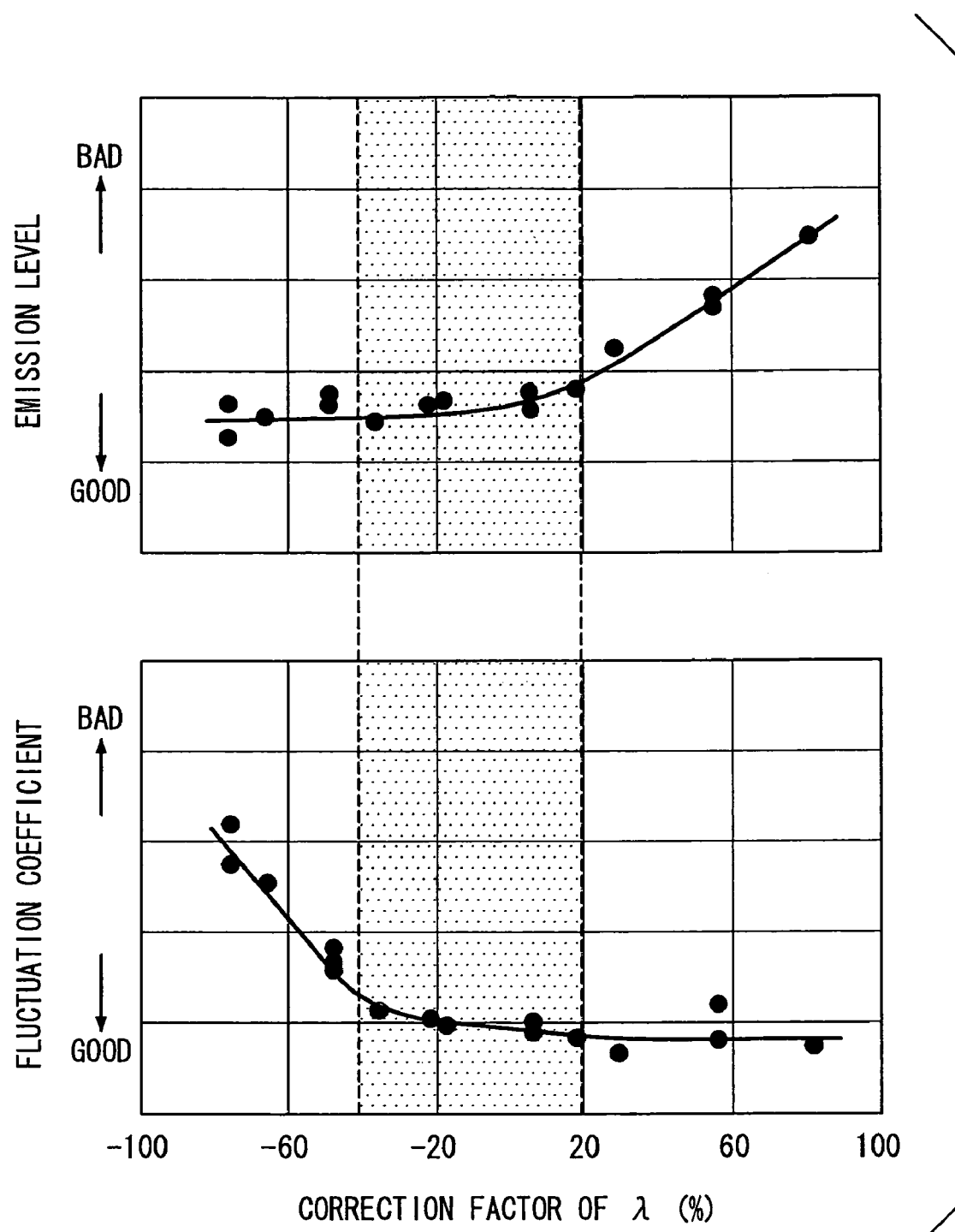
FIG. 9 is a graph showing a relationship among a correction factor of an air-fuel ratio λ, an amount of emission, and a coefficient of fluctuation in output power.

Next, an example effect of the injector in this embodiment is described in reference to FIG. 9. In FIG. 9, the horizontal axis corresponds to a correction factor of the air-fuel ratio λ, which is initially set, in the upper corner space D shown in FIG. 8. The vertical axis of the upper graph in FIG. 9 corresponds to an amount (emission level) of emission. The vertical axis of the lower graph in FIG. 9 corresponds to a coefficient of fluctuation (fluctuation coefficient) in output power between injection cycles. The amount of emission corresponds to an amount of substance such as hydrocarbon (HC) exhausted due to insufficient mixture of fuel and air, for example.

The coefficient of fluctuation in output power indicates magnitude of variation in output power between injection cycles due to incomplete combustion caused by insufficient mixture of air and fuel, for example. As the coefficient of fluctuation in output power becomes greater, fuel efficiency is reduced corresponding to increase in amount of emission.

When the correction factor is in a range between −40% and +20% in the upper corner space D, the amount of emission and the variation in output power are in an allowable range. The center of the range (correction factor range) of the correction factor is on the negative side with respect to the 0% of the correction factor. That is, this center of the correction factor range is on a lean side, on which the air-fuel ratio λ becomes large. Therefore, it is effective to correct the air-fuel ratio λ to be greater in the upper corner space D, which mainly includes the wall surface 6a of the cylinder 6.

For example, 50% to 60% of the entire in-cylinder space 6b may be occupied by the entire divided spaces. For example, the standard air-fuel ratio λ in the divided spaces A, B, and C may be set at 8. For example, the standard air-fuel ratio λ may be corrected in a range between −70% and +90% in the entire divided spaces A, B, and C. When these conditions are satisfied, both high output power and low emission can be produced by applying the definition of the amount of fuel injection and the injecting direction in this embodiment described above. The divided spaces A, B, and C may be adjusted for setting the air-fuel ratio λ in a condition where the fuel injection amount is constant. Alternatively, the fuel injection amount may be adjusted for setting the air-fuel ratio λ in a condition where the divided spaces A, B, and C are constant.

According to this embodiment, the injector 1 is capable of preferably arranging mixture of air and fuel in the in-cylinder space 6b, so that the in-cylinder space 6b can be efficiently utilized while mixture of air and gas is stabilized. In addition, high output power and low emission can be maintained by restricting incomplete combustion of fuel.

Modification of First Embodiment

Figure 10:
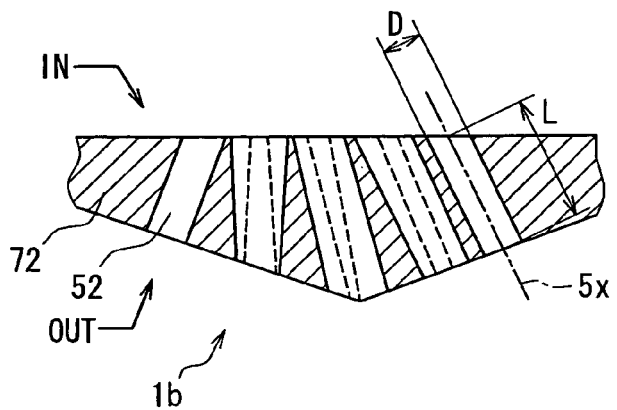
FIG. 10 is a longitudinal sectional view showing a nozzle plate according to a modification of first embodiment.

As shown in FIG. 10, the nozzle 1b has the nozzle holes 52. In this embodiment, a nozzle plate 72 has a substantially flat surface on the side of the fuel inlet depicted by IN in FIG. 10. The nozzle plate 72 has two substantially flat surfaces on the side of the fuel outlet depicted by OUT in FIG. 10.

Each of the nozzle holes 52 has an inner diameter, which is substantially uniform. The fuel inlet of the nozzle hole 52 is distant from the fuel outlet of the nozzle hole 52 for a nozzle hole length L. Each of the nozzle holes D has the inner diameter D. As a value L/D, which is calculated by dividing the hole length L by the inner diameter D, increases, the penetration of fuel injection increases. Each of the injection distances is the length between the fuel outlet of each of the nozzle holes 51 and the surface, onto which fuel is injected from the corresponding one of the nozzle holes 51. In this structure, the penetration of fuel injection may be set greater as the injection distance becomes large.

The number of density of the imaginary injection lines 5y may be set substantially constant with respect to the unit volume in the divided spaces A, B, and C.

Summarizing, in this embodiment, the fuel injection valve 1 is provided for injecting fuel into the internal combustion engine 100. The internal combustion engine 100 includes the cylinder 6, the cylinder head 3, and the piston 4. The piston 4 is movable along the wall surface 6a of the cylinder 6. The fuel injection valve 1 includes a nozzle 1a that is located in the vicinity of the cylinder head 3. The nozzle 1a has the nozzle holes 51. Each of the nozzle holes 51 is opposed to the in-cylinder space 6b defined in the cylinder 6. Each nozzle hole 51 has the imaginary injection line 5y that extends from each nozzle hole 51 into the in-cylinder space 6b. The imaginary injection line 5y is directed toward one of the upper surface 4a of the piston 4 and the wall surface 6a of the cylinder 6. The in-cylinder space 6b includes multiple divided spaces A, B, C each including the nozzle 1a and at least one imaginary injection line 5y. The divided spaces A, B, C include a piston-side divided space and a head-side divided space, for example. The piston-side divided space is adjacent to the piston 4. The head-side divided space is adjacent to the cylinder 6. The head-side divided space contains fuel and air mixed at the air fuel ratio $\lambda$ that is greater than the air fuel ratio $\lambda$ of fuel and air in the piston-side divided space.

In this embodiment, the divide space A may correspond to the cylinder head-side divided space. The divide space C may correspond to the piston-side divided space.

The air fuel ratio $\lambda$ in each divided space A, B, C may be defined in accordance with at least one of the following two conditions: temperature of the upper surface 4a of the piston 4 adjacent to the piston-side divided space; and temperature of the wall surface 6a of the cylinder 6 adjacent to the head-side divided space.

The upper surface 4a of the piston 4 may occupy a first area in the piston-side divided space. As the first area becomes large, the air fuel ratio $\lambda$ in the piston-side divided space may be defined to be small.

The wall surface 6a of the cylinder 6 may occupy a second area in the head-side divided space. As the second area becomes large, the air fuel ratio $\lambda$ in the head-side divided space may be defined to be large.

The upper surface 4a of the piston 4 may occupy a first area in the piston-side divided space. As the first area becomes large, the air fuel ratio $\lambda$ in the piston-side divided space may be defined to be small. The wall surface 6a of the cylinder 6 may occupy a second area in the head-side divided space. As the second area becomes large, the air fuel ratio $\lambda$ in the head-side divided space may be defined to be large.

An amount of fuel injected through each nozzle hole 51 may be defined substantially uniform. Each divided space A, B, C may include a predetermined number of the imaginary lines 5y per unit volume. An amount of fuel injected into each divided space A, B, C may be defined in accordance with the number of the imaginary lines 5y included in per unit volume.

Each divided spaces A, B, C may include a predetermined number of the imaginary lines 5y per unit volume. The predetermined number may be substantially uniformly defined for each divided space A, B, C. An amount of fuel injected into each divided space A, B, C may be defined in accordance with an amount of fuel injected through each nozzle hole 51.

The air fuel ratio $\lambda$ may be corrected in a range between −70% and +90%.

Fuel is injected from each nozzle hole 51 into each divided spaces A, B, C at penetration force. Each nozzle hole 51 is distant from the wall surface 6a of the cylinder 6 for a first injection distance. Each nozzle hole 51 is distant from the upper surface 4a of the piston 4 for a second injection distance. The penetration force may be defined in accordance with the first injection distance and the second injection distance. The penetration force may be defined such that fuel is substantially evaporated immediately before the fuel reaches one of the wall surface 6a of the cylinder 6 and the upper surface 4a of the piston 4.

The imaginary lines 5y respectively extend radially from the nozzle 1a into the in-cylinder space 6b. Two of the imaginary lines 5y, which is adjacent to each other, define the radiation angle $\theta$. As the radiation angle $\theta$ becomes small, the penetration force may be defined to be large.

Each nozzle hole 51 has the inlet and the outlet, which are distant from each other for a distance L. Each nozzle hole 51 has an inner diameter D. As a value L/D, which is calculated by dividing the distance L by the inner diameter D, becomes large, the penetration force may be defined to be large.

Each nozzle hole 51 has the inlet and the outlet, which are distant from each other for a distance L. Each nozzle hole 51 is distant from the wall surface 6a of the cylinder 6 for a first injection distance. As the first injection distance becomes large, the distance L may be defined to be larger. Each nozzle hole 51 has the inner diameter that may be substantially uniform. Each divided space A, B, C may include a predetermined number of the imaginary lines 5y per unit volume. An amount of fuel injected into each divided space A, B, C may be defined in accordance with the number of the imaginary lines 5y included in per unit volume.

The cylinder 6 may have an upper corner portion on the side of the cylinder head 3. The nozzle 1a may be arranged in the upper corner portion. Fuel may be injected from the upper corner portion directly into the cylinder 6.

Second Embodiment

Figure 11:
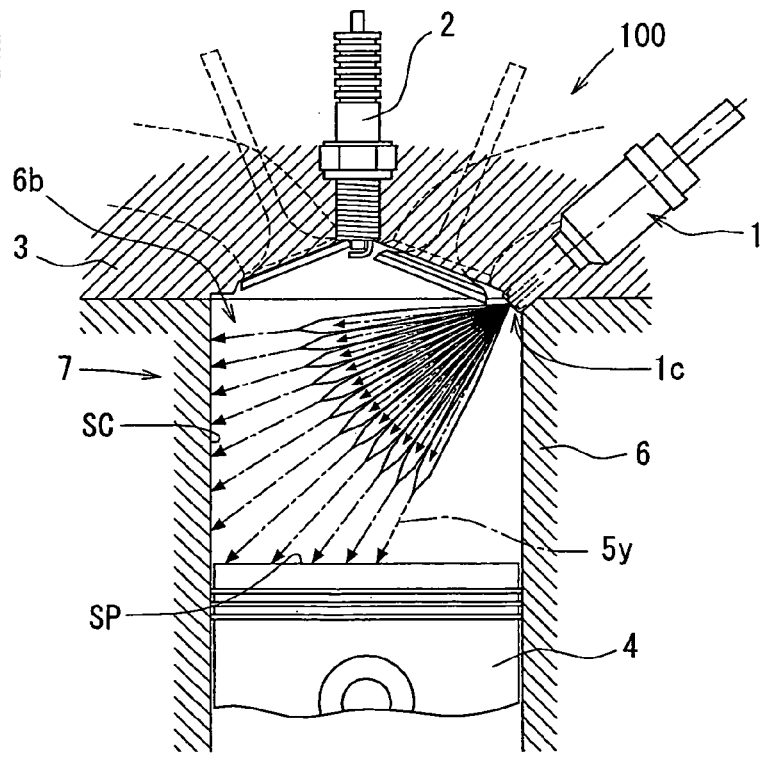
FIG. 11 is a partially longitudinal sectional view showing the cylinder of the engine provided with a fuel injection valve according to a second embodiment.
Figure 12:
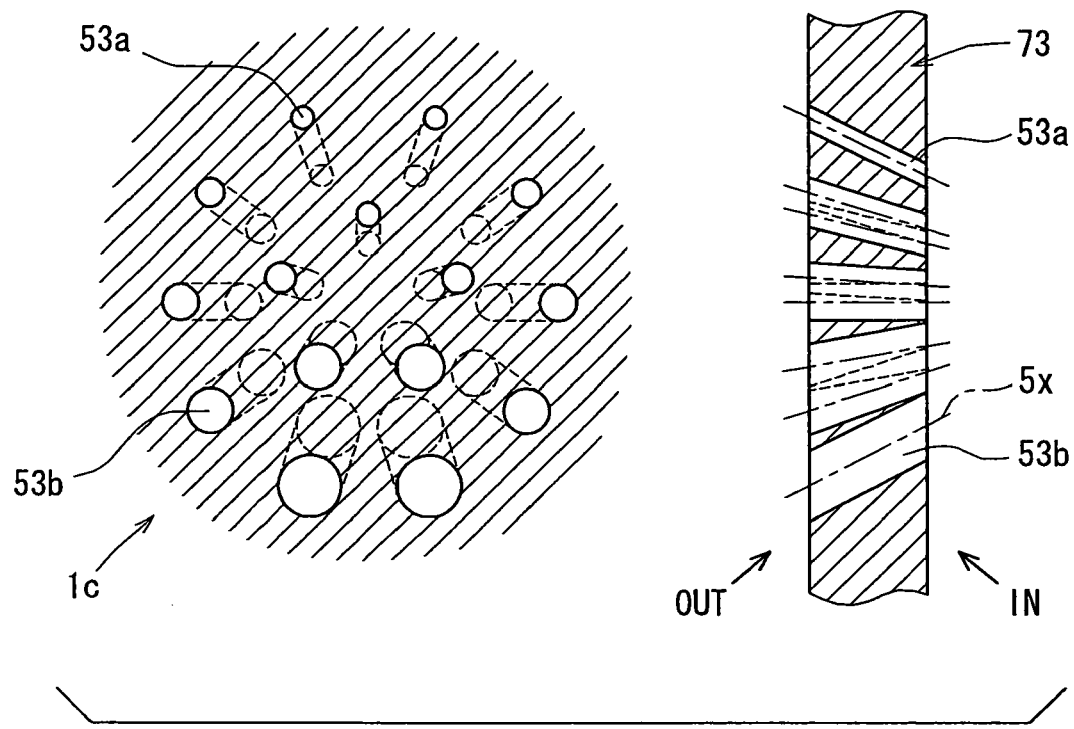
FIG. 12 is a schematic view showing a nozzle plate according to the second embodiment.
Figure 13:
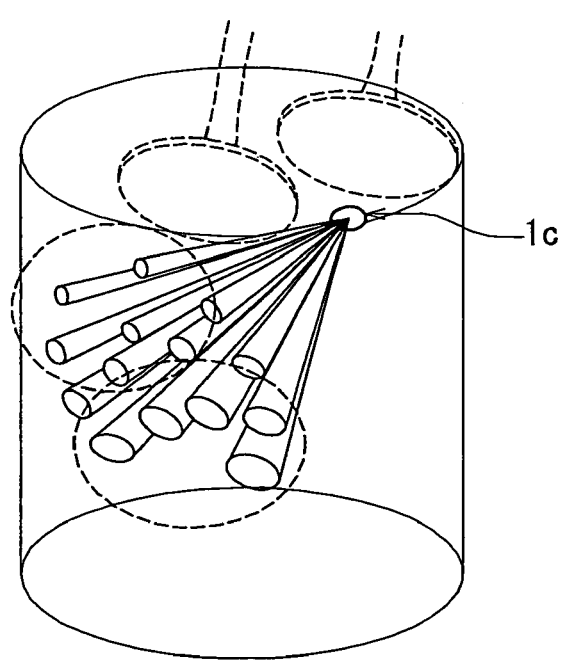
FIG. 13 is a schematic perspective view showing the cylinder and fuel injected into the cylinder, according to the second embodiment.

As follows, the second embodiment is described in reference to FIGS. 11 to 13. As shown in FIG. 12, a nozzle 1c includes a nozzle plate 73 that has nozzle holes 53a, 53b. The inner diameters of the nozzle holes 53a, 53b are different from each other. Each of the nozzle holes 53a corresponds to the imaginary injection line 5y directed to the wall surface 6a of the cylinder 6. Each of the nozzle holes 53b corresponds to the imaginary injection line 5y directed to the upper surface 4a of the piston 4. The inner diameter of each of the nozzle holes 53a is set smaller than the inner diameter of each of the nozzle holes 53b, so that the amount of fuel injected through the nozzle holes 53a becomes less than the amount of fuel injected through the nozzle holes 53b. In this example embodiment, each of the nozzle holes has two kinds of inner diameters on both sides of the piston 4 and the cylinder 6. The number of density of the imaginary injection lines 5y may be set substantially constant with respect to the unit volume in the divided spaces A, B, and C. As the inner diameter of the each of the nozzle holes 53a, 53b is set greater, the penetration of fuel injected through the nozzle holes 53a, 53b becomes greater. The penetration of fuel may be set by combining the inner diameter of the each of the nozzle holes 53a, 53b and the value L/D, which is calculated by dividing the hole length L by the inner diameter D.

Third Embodiment

Figure 14:
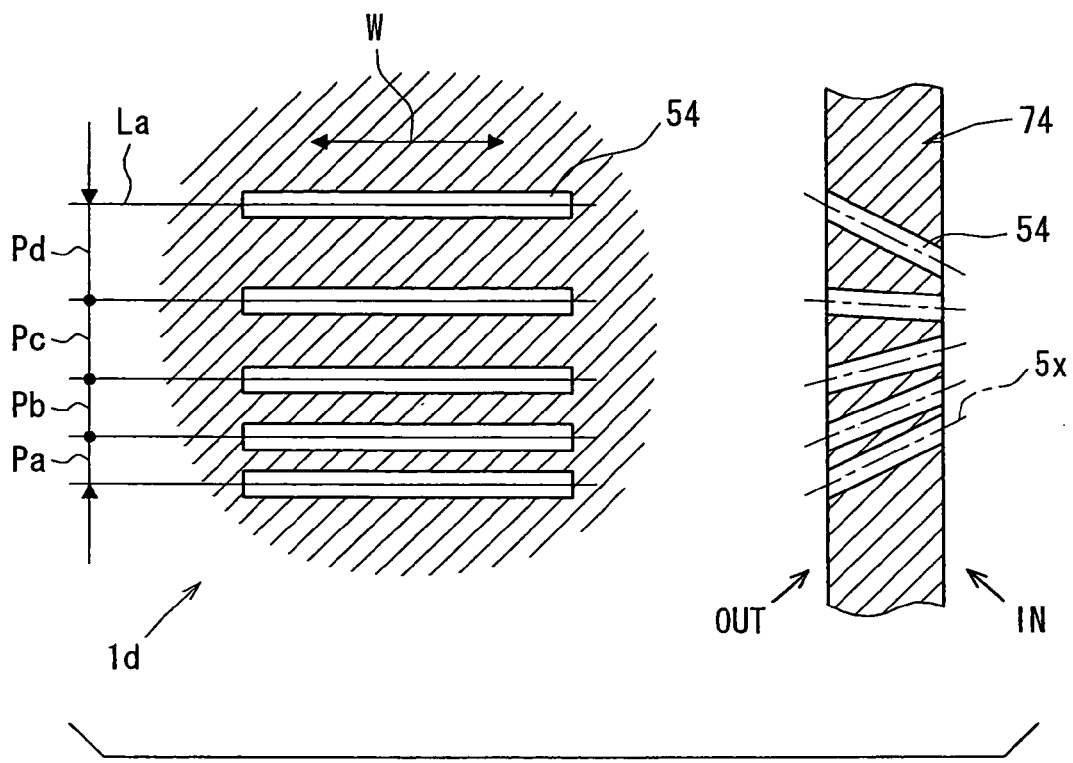
FIG. 14 is a schematic view showing a nozzle plate according to a third embodiment.
Figure 15:
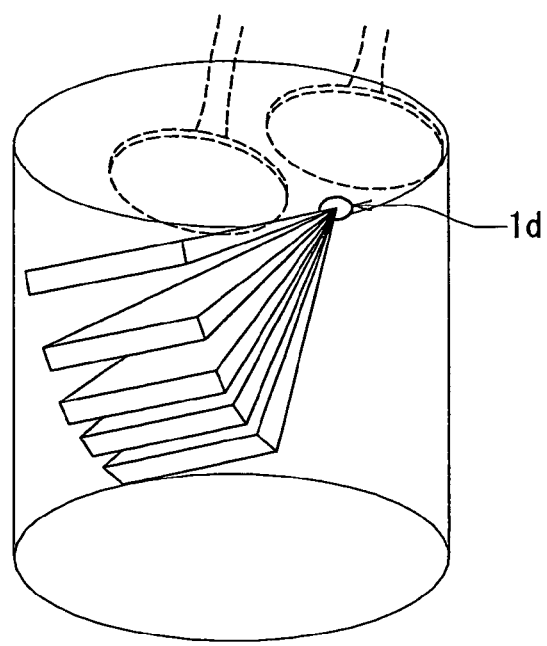
FIG. 15 is a schematic perspective view showing the cylinder and fuel injected into the cylinder, according to the third embodiment.

As follows, the third embodiment is described in reference to FIGS. 14, 15. A nozzle 1d includes a nozzle plate 74 that has nozzle holes 54. Each of the nozzle holes 54 has a cross section in a substantially flat slit shape. Each of the nozzle holes 54 has a cross sectional area, which is substantially uniform. In this structure, the amount of fuel injected through each of the nozzle holes 54 is substantially constant.

The nozzle holes 54 are arranged along an alignment direction from the side of the upper surface 4a of the piston 4 toward the wall surface 6a of the cylinder 6. The longitudinal direction of each of the nozzle holes 54 is arranged along the direction shown by arrow W in FIG. 14 such that the longitudinal direction of each of the nozzle holes 54 is substantially perpendicular to the alignment direction. Further, each of imaginary lines La extends along the longitudinal direction of each of the nozzle holes 54. The imaginary lines La are substantially in parallel with each other. The imaginary lines La, which are adjacent to each other, are distant from each other for one of distances Pa, Pb, Pc, and Pd. The distances Pa, Pb, Pc, and Pd are variably adjusted, so that the amount of fuel injected into each of the divided spaces A, B, and C is adjusted. The penetration of fuel injected from each of the nozzle holes 54 is defined in accordance with value L/D, which is calculated by dividing the hole length L by a passage sectional area D. The passage sectional area D of each of the nozzle holes 54 indicates the cross sectional area of each of the nozzle holes 54.

Summarizing, in this third embodiment, each nozzle hole 54 has the cross section that is in a substantially flat slit shape. The plurality of nozzle holes 54 are arranged along an arrangement direction. The arrangement direction is defined from the upper surface 4a of the piston 4 toward the wall surface 6a of the cylinder 6. The cross section of each nozzle hole 54 extends along the longitudinal direction of each nozzle hole 54. The longitudinal direction is substantially perpendicular to the arrangement direction. The longitudinal directions of the plurality of nozzle holes 54 may be substantially in parallel with each other. An amount of fuel injected through each nozzle hole 54 may be defined substantially uniform. An amount of fuel injected into each of the plurality of divided spaces A, B, C may be defined in accordance with the distance between two of the plurality of nozzle holes 54, which are adjacent to each other.

Fourth Embodiment

Figure 16:
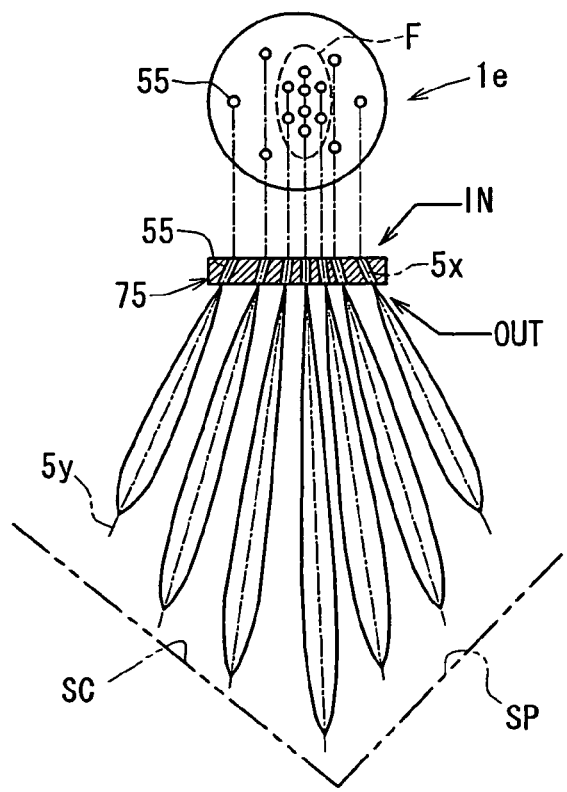
FIG. 16 is a schematic view showing a nozzle of a fuel injection valve and imaginary injection lines of fuel injected from the nozzle, according to a fourth embodiment.

As follows, a fourth embodiment is described in reference to FIG. 16. A nozzle 1e includes a nozzle plate 75 that has nozzle holes 55. As depicted by F in FIG. 16, a part of the nozzle holes 55 are concentrated together to define a group (nozzle hole group) of the nozzle holes 55, thereby forming converged imaginary injection lines 5y. Alternatively, a group of the nozzle holes 55 may be concentrated together to form substantially one imaginary injection line 5y. Each of the nozzle holes 55 has a substantially uniform inner diameter. Various adjustments are performed to the group of the nozzle holes 55 corresponding to predetermined penetration of the fuel injection. The various adjustments include defining the distance of adjacent nozzle holes 55, the number of the nozzle holes 55, and the inner diameter of the nozzle holes 55, for example.

Summarizing, in this fourth embodiment, the nozzle 1e includes the nozzle plate 75 that is in a substantially flat disc-shape. The multiple nozzle holes 55 are formed in the nozzle plate 75. The multiple nozzle holes 55 have the nozzle hole group F, in which multiple imaginary injection lines 5y of the nozzle holes 55 form a substantially integrated one imaginary injection line 5y. At least one of the following parameters may be defined in accordance with the penetration force in the nozzle hole group F: the distance between two of the plurality of nozzle holes 55, which are adjacent to each other; the number of the plurality of nozzle holes 55; and the inner diameter of each nozzle hole 55.

Fifth Embodiment

Figure 17:
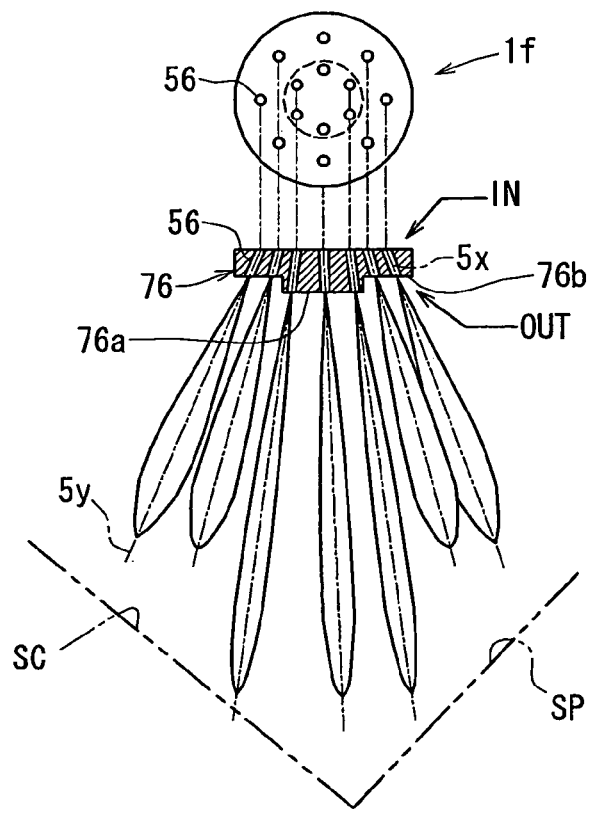
FIG. 17 is a schematic view showing a nozzle of a fuel injection valve and imaginary injection lines of fuel injected from the nozzle, according to a fifth embodiment.

As follows, a fifth embodiment is described in reference to FIG. 17. A nozzle 1f includes a nozzle plate 76 that has a flat surface on the side of the fuel inlet depicted by IN in FIG. 17. The nozzle plate 76 has a stepped surface on the side of the fuel outlet depicted by OUT in FIG. 17, such that the nozzle plate 76 has two different thicknesses. The nozzle plate 76 has a thick portion 76a that is in a substantially circular shape formed around the nozzle of the nozzle plate 76. The nozzle plate 76 has a thin portion 76b around the thick portion 76a.

The nozzle plate 76 has the nozzle holes 56. Each of the nozzle holes 56 has a substantially uniform inner diameter. The penetration of fuel injection is adjusted respectively to the thick portion 76a and the thin portion 76b.

Sixth Embodiment

Figure 18:
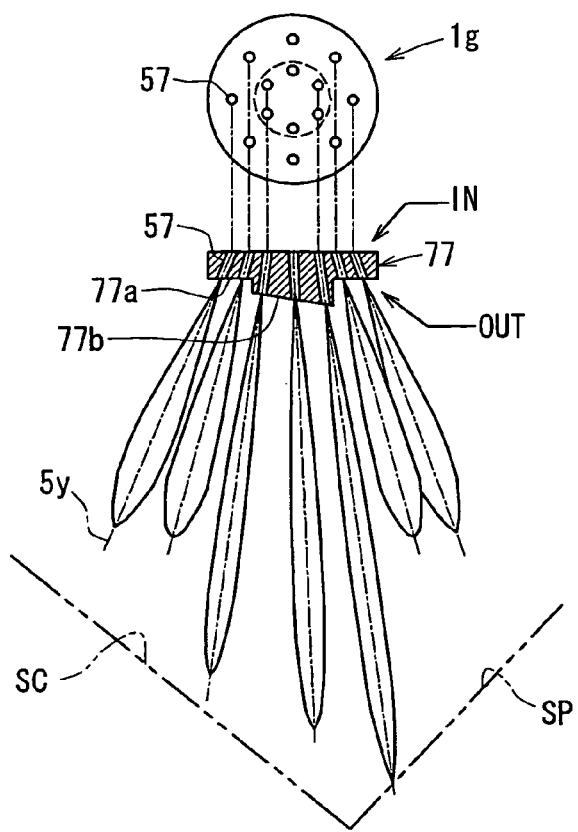
FIG. 18 is a schematic view showing a nozzle of a fuel injection valve and imaginary injection lines of fuel injected from the nozzle, according to a sixth embodiment.

As follows, a sixth embodiment is described in reference to FIG. 18. A nozzle 1 g includes a nozzle plate 77 that has a flat surface on the side of the fuel inlet depicted by IN in FIG. 18. The nozzle plate 76 has a flat surface 77a and a slant surface 77b on the side of the fuel outlet depicted by OUT in FIG. 18. The flat surface 77a is substantially in parallel with the flat surface of the side of the fuel inlet. The slant surface 77b is slanted relative to the flat surface on the side of the fuel inlet. The slant surface 77b is in a substantially circular shape formed around the nozzle of the nozzle plate 77. The nozzle plate 77 has the nozzle holes 57. Each of the nozzle holes 57 has a substantially uniform inner diameter. The penetration of fuel injection is adjusted by modifying the thickness of a flat portion of the nozzle plate 77 defined by the flat surface 77a, for example. The penetration of fuel injection is also adjusted by modifying the slant angle of the slant surface 77b, for example.

Seventh Embodiments

Figure 19:
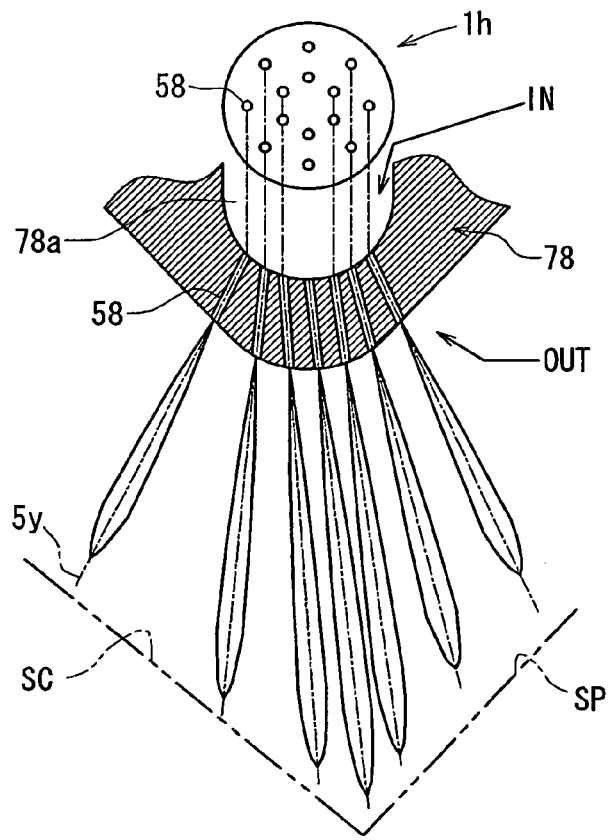
FIG. 19 is a schematic view showing a nozzle of a fuel injection valve and imaginary injection lines of fuel injected from the nozzle, according to a seventh embodiment.

As follows, a seventh embodiment is described in reference to FIG. 19. A nozzle 1h includes a nozzle body 78 that is provided instead of the nozzle plate 71 described in the first embodiment. The nozzle body 78 is a sack nozzle having a sack chamber 78a, for example.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel injection valve for injecting fuel into an internal combustion engine, the internal combustion engine including a cylinder, a cylinder head, and a piston, the piston being movable along a wall surface of the cylinder, the fuel injection valve-comprising:

a nozzle that is located in the vicinity of the cylinder head, the nozzle having a plurality of nozzle holes, wherein each of the plurality of nozzle holes is defined in such a manner that:

each nozzle holes is opposed to an in-cylinder space defined in the cylinder;

each nozzle hole has an imaginary injection line that extends from each nozzle hole into the in-cylinder space;

the imaginary injection line is directed toward one of an upper surface of the piston and the wall surface of the cylinder;

the in-cylinder space includes a plurality of divided spaces each including the nozzle and at least one imaginary injection line;

the plurality of divided spaces includes a piston-side divided space and a head-side divided space;

the piston-side divided space is adjacent to the piston;

the head-side divided space is adjacent to the cylinder; and the head-side divided space contains fuel and air mixed at an air fuel ratio, which is greater than an air fuel ratio of fuel and air in the piston-side divided space.

2. The fuel injection valve according to claim 1, wherein each nozzle hole is defined in such a manner that:

the air fuel ratio in each of the plurality of divided spaces is defined in accordance with at least one of:

temperature of the upper surface of the piston adjacent to the piston-side divided space; and temperature of the wall surface of the cylinder adjacent to the head-side divided space.

3. The fuel injection valve according to claim 2, wherein each nozzle hole is defined in such a manner that:

an amount of fuel injected through each nozzle hole is defined substantially uniform;

each of the plurality of divided spaces includes a predetermined number of a plurality of the imaginary lines per unit volume; and an amount of fuel injected into each divided space is defined in accordance with the number of the plurality of the imaginary lines included in per unit volume.

4. the fuel injection valve according to claim 2, wherein each nozzle hole is defined in such a manner that:

each nozzle hole has a cross section that is in a substantially flat slit shape;

the plurality of nozzle holes are arranged along an arrangement direction;

the arrangement direction is defined from the upper surface of the piston toward the wall surface of the cylinder;

the cross section of each nozzle hole extends along a longitudinal direction of each nozzle hole;

the longitudinal direction is substantially perpendicular to the arrangement direction;

the longitudinal directions of the plurality of nozzle holes are substantially in parallel with each other;

an amount of fuel injected through each nozzle hole is defined substantially uniform; and an amount of fuel injected into each of the plurality of divided spaces is defined in accordance with a distance between two of the plurality of nozzle holes, which are adjacent to each other.

5. The fuel injection valve according to claim 2, wherein each nozzle hole is defined in such a manner that:

each of the plurality of divided spaces includes a predetermined number of a plurality of the imaginary lines per unit volume;

the predetermined number is substantially uniformly defined for each divided space; and an amount of fuel injected into each divided space is defined in accordance with an amount of fuel injected through each nozzle hole.

6. The fuel injection valve according to claim 1, wherein each nozzle hole is defined in such a manner that:

as the upper surface occupied by each of the plurality of divided spaces becomes greater, the air fuel ratio in the each of the plurality of divided spaces is defined to be smaller.

7. The fuel injection valve according to claim 1, wherein each nozzle hole is defined in such a manner that:

as the wall surface occupied by each of the plurality of divided spaces becomes greater, the air fuel ratio in the each of the plurality of divided spaces is defined to be larger.

8. The fuel injection valve according to claim 7, wherein each nozzle hole is defined in such a manner that:

the air fuel ratio is corrected in a range between −70% and +90%.

9. The fuel injection valve according to claim 1, wherein each nozzle hole is defined in such a manner that:

as the upper surface occupied by each of the plurality of divided spaces becomes greater, the air fuel ratio in the each of the plurality of divided spaces is defined to be smaller; and as the wall surface occupied by each of the plurality of divided spaces becomes greater, the air fuel ratio in the each of the plurality of divided spaces is defined to be larger.

10. The fuel injection valve according to claim 1, wherein each nozzle hole is defined in such a manner that:

fuel is injected from each nozzle hole into each of the plurality of divided spaces at penetration force;

each nozzle hole is distant from the wall surface of the cylinder for a first injection distance;

each nozzle hole is distant from the upper surface of the piston for a second injection distance;

the penetration force is defined in accordance with the first injection distance and the second injection distance; and the penetration force is defined such that fuel is substantially evaporated immediately before the fuel reaches one of the wall surface of the cylinder and the upper surface of the piston.

11. The fuel injection valve according to claims 10, wherein each nozzle hole is defined in such a manner that:

a plurality of the imaginary lines respectively extend radially from the nozzle into the in-cylinder space;

two of the plurality of the imaginary lines, which is adjacent to each other, define a radiation angle; and as the radiation angle becomes small, the penetration force is defined to be large.

12. The fuel injection valve according to claims 10, wherein each nozzle hole is defined in such a manner that:

each nozzle hole has an inlet and an outlet, which are distant from each other for a distance L;

each nozzle hole has an inner diameter D; and as a value L/D, which is calculated by dividing the distance L by the inner diameter D, becomes large, the penetration force is defined to be large.

13. The fuel injection valve according to claims 10, wherein each nozzle hole is defined in such a manner that:

the nozzle includes a nozzle plate that is in a substantially flat disc-shape;

the plurality of nozzle holes is formed in the nozzle plate;

the plurality of nozzle holes has a nozzle hole group, in which a plurality of the imaginary injection lines of the plurality of nozzle holes form a substantially integrated one imaginary injection line; and at least one of the following parameters is defined in accordance with the penetration force in the nozzle hole group:

a distance between two of the plurality of nozzle holes, which are adjacent to each other;

a number of the plurality of nozzle holes; and an inner diameter of each nozzle hole.

14. The fuel injection valve according to claim 1, wherein each nozzle hole is defined in such a manner that:

each nozzle hole has an inlet and an outlet, which are distant from each other for a distance L;

each nozzle hole is distant from the wall surface of the cylinder for a first injection distance;

as the first injection distance becomes large, the distance L is defined to be larger;

each nozzle hole has an inner diameter that is substantially uniform;

each of the plurality of divided spaces includes a predetermined number of a plurality of the imaginary lines per unit volume; and an amount of fuel injected into each divided space is defined in accordance with the number of the plurality of the imaginary lines included in per unit volume.

15. The fuel injection valve according to claim 1, wherein each nozzle hole is defined in such a manner that:

the cylinder has an upper corner portion on a side of the cylinder head;

the nozzle is arranged in the upper corner portion; and fuel is injected from the upper corner portion directly into the cylinder.

* * * * *